Feb. 26, 1924.

N. C. STOREY

VEHICLE

Filed March 12, 1919    2 Sheets-Sheet 1

INVENTOR
Norman C. Storey
BY
Gifford & Bull
his ATTORNEYS

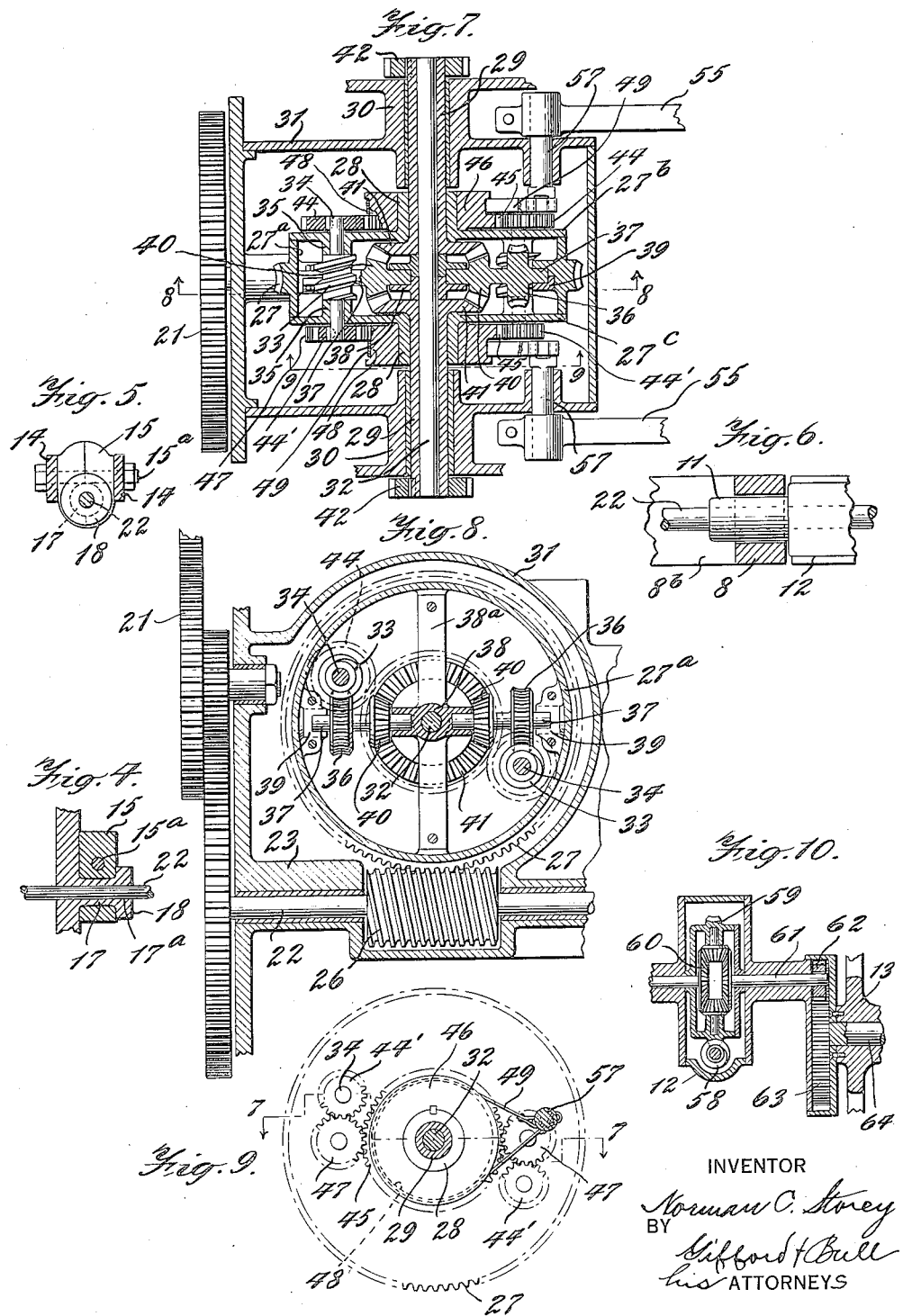

Patented Feb. 26, 1924.

1,484,974

UNITED STATES PATENT OFFICE.

NORMAN C. STOREY, OF ROCKAWAY, NEW JERSEY.

VEHICLE.

Application filed March 12, 1919. Serial No. 282,149.

*To all whom it may concern:*

Be it known that I, NORMAN C. STOREY, a citizen of the United States, residing at Rockaway, in the county of Morris and State of New Jersey, have invented certain new and useful Improvements in Vehicles, of which the following is a specification.

My invention relates to a vehicle, and more particularly to a vehicle of the motor-driven type.

One of the objects of my invention is the provision of a motor-driven vehicle in which all the wheels are driven and in which the steering is effected by mechanism interposed in the driving connections between the driving motor and the driving wheels, the driving wheels being normally locked together, associated means being provided for changing the speed ratio of the two wheels.

Another object of my invention is the provision of a vehicle in which the frame is constructed and arranged to afford flexibility of movement between the front and rear portions of the vehicle, and which is both simple and strong.

Other objects of my invention will appear in the specification and the novelty thereof will be particularly pointed out in the claims.

My invention will best be understood by reference to the accompanying drawings, in which like reference characters indicate like parts, and in which Fig. 1 is a side view of a tractor embodying my invention; Fig. 2 is a plan view of the same, partially in section with the engine removed; Fig. 3 is a sectional detail elevation showing parts associated with the steering mechanism; Fig. 4 is a detail sectional view of one of the bearings between the intermediate section of the frame and the frame of the rear portion of the vehicle; Fig. 5 is a sectional elevation on the line 5—5 of Fig. 1; Fig. 6 is a section on the line 6—6 of Fig. 1; Fig. 7 is a sectional view of the controllable differential mechanism taken on the line 7—7 of Fig. 9; Fig. 8 is a section on the line 8—8 of Fig. 7; Fig. 9 is a sectional side view on the line 9—9 of Fig. 7, and Fig. 10 is a sectional view illustrating the differential mechanism for the rear truck.

Referring, now, to the drawings, the frame for the vehicle comprises three sections which are connected together and arranged in such a manner as to permit the front and rear trucks to swing freely with reference to each other about a vertical axis and to permit them to rotate with reference to each other about a longitudinal axis in such a way that they have universal movement with respect to each other. The front section 1 of the frame is supported on an axle 2, which is, in turn, supported on the front driving wheels 3. The frame 1 is provided with upper and lower sets of supporting lugs or brackets 4 and 5, respectively, each set preferably comprising two lugs which are suitably spaced apart to receive corresponding brackets 6 and 7 formed on the intermediate frame section 8. The section 8 is preferably triangular in shape and vertically disposed, the upper leg of the triangle being indicated by the reference character $8^a$, the lower leg by the reference character $8^b$, and the vertical leg, which is disposed adjacent to the front truck, by the reference character $8^c$. The supporting lugs 6 and 7, which are formed on the intermediate section at the ends of the vertical leg $8^c$, are pivoted to the brackets 4 and 5, respectively, by pivot pins or bolts 9, which form a vertical axis about which the two trucks may freely swing with reference to each other in a horizontal plane. The rear end of the intermediate section 8 is provided with a cylindrical opening, and forms a journal for a bearing lug or member 11, which is preferably formed on the differential casing of the rear truck, which is, in turn, secured to the rear section 12 of the frame. The rear frame is supported on driving wheels 13. Supporting arms 14 are secured to or formed integral with the rear frame and extend forwardly, the rear ends of the straps being preferably spaced apart to a considerable extent and disposed adjacent to the rear driving wheels 13, while the front ends of the straps approach each other and embrace a journal member 15, which is preferably formed in two parts (see Fig. 5), the ends of the straps and the journal member being secured together by a bolt $15^a$. The journal member 15 is provided with a cylindrical opening in which is received a bearing member 17 (see Fig. 4), which bearing member is secured to, and is preferably formed integral with the vertical leg $8^c$ of the front section of the frame. The outer end of the bearing member 17 is preferably formed with an integral disc 18 which engages the journal member 15. The bearing member 17 is preferably provided with a central opening 17ª, through which the drive shaft passes, as will more fully hereinafter appear.

In common practice, a reach is provided between the two trucks, with a yoke forming a pivotal connection. Such a construction is objectionable, since enormous bending stresses are set up in the reach between the pivotal connection formed by the yoke and the first bearing from the yoke on the reach. Because of this difficulty, the reach and yoke have to be made of excessive weight to withstand the stresses and strains to which it is necessarily subjected, and such excessive weight is objectionable. In accordance with my invention, the foregoing difficulties are overcome by the use of overlapping trusses.

The intermediate section or member 8 forms a truss, preferably vertically arranged, and in its preferred form, having an upper side 8ª and a vertical side 8ᶜ forming compression members, while the lower side 8ᵇ forms a tension member. This truss member permits vertically spaced pivotal connections with the front truck, which gives the maximum strength for supporting the front truck. The pivotal connection between the truss member 8 and, in the form illustrated, the housing on the rear truck for the transmission is formed at a point adjacent to the rear axle, in order substantially to eliminate the bending stresses on what constitutes the ordinary reach between the two trucks, and caused by the torsional strains of the transmission on the forward truck. Furthermore, the arms 14, which are rigid with the rear truck, form therewith a truss, preferably located in a substantially horizontal plane and forming a pivotal connection with the vertical truss, preferably at a point adjacent to the pivotal connections formed by the pins or bolts 9. The horizontal truss takes the strains of the rear truck, such, for example, as would be occasioned by one of the wheels encountering an obstacle, and by the strains set up by driving mechanism.

The prime mover, which is here shown as an internal combustion engine 19, is preferably, though not necessarily, mounted on the front truck of the vehicle and actuates the shaft 20, which is connected to a transmission within the transmission casing 20ª, the shaft 20ᵇ on the opposite side of the transmission casing, being connected to a train of gears 21, the last gear of which is secured on one end of the drive shaft 22. When both sets of driving wheels are connected to the prime mover, as is the case here illustrated, the drive shaft is formed in two sections, the front section of which has its bearings on the frame of the front truck at 23 and 24, a universal joint 25 being provided between the front and rear sections and in line with the vertical axis formed by the bolts 9 on which the front and rear trucks are pivoted. The drive shaft 22 is arranged concentrically with the longitudinal axis about which the front and rear trucks are pivoted, so that the shaft is not affected by such turning of the two trucks about such axis, the shaft extending through the bearing which the front and rear sections form with, the intermediate sections as indicated in Figs. 4 and 6. A worm 26 is secured on the front section of the drive shaft and engages a worm wheel 27, though it will, of course, be understood that bevel gearing or other suitable gearing could be used. The differential mechanism which is interposed between the worm 26 and the driven wheels comprises a differential housing or casing, which is here shown as formed in three sections. The middle section 27ª is cylindrical in form and preferably has the worm gear 27 formed directly thereon, while the two side sections 27ᵇ and 27ᶜ are clamped to the middle section 27ª. The sections 27ᵇ and 27ᶜ are formed at their middle portions with sleeves 28 having their bearings on sleeves 29, which, in turn, have their bearings in bosses or lugs 30 formed on the outer differential casing 31. The sleeves 29 surround an axle 32. A worm 33 is secured to a shaft 34 which has its bearing at 35 in the two sections 27ᵇ and 27ᶜ of the differential casing. For convenience I shall refer in the description and in the claims to only one worm and the parts associated therewith, though it will be understood that two or more than two such worms and associated parts may be used, and preferably two such worms, as illustrated in the drawings, are used. The worm 33 engages a worm wheel 36 on a shaft 37 extending radially from the axle 32, which shaft has its bearing at its inner end in a hub 38 surrounding the axle 32 and which is formed integral with or otherwise secured to the section 27ª of the casing by arms 38ª. The outer end of the shaft 37 has its bearing in a boss or lug 39 formed on the inner side of the section 27ª of the differential casing. The worm 33 is arranged to form a self-locking engagement with the worm wheel 36, so that the worm normally does not rotate about its own axis. A differential bevel pinion 40 is secured to the shaft 37 and is preferably formed integral therewith. The differential pinion 40 engages the bevel gears 41 formed on the inner ends of the sleeves 29. To the outer ends of the sleeves 29 are secured pinions 42 which engage interior gears 43 secured to the wheels 3, though it will, of course, be understood that the internal gears may be formed directly on the wheels 3, if desired.

To the ends of the shaft 34, without the casing and at one side thereof, the upper side, as viewed in Fig. 7, is secured a pinion 44 which engages a gear 45 formed on a disc or member 46 loosely mounted on the sleeve 28. A pinion 44' is similarly secured on the other end of the shaft 34, and this pinion engages a gear 45 through an idler 47. It will thus be apparent that the two driving wheels are normally locked together and rotate at the same speed, the worm 33 and the worm wheel 36 forming a self-locking engagement, and the pinion 44 rotating the gears 45 about the axes of the latter. In case, therefore, either of the wheels encounters a soft spot in the ground, such as a mud hole, there will be no tendency for this wheel to rotate and for the other wheel which is on firm ground to stand still, as would be the case with an ordinary differential, but the wheel which is on firm ground will drive the vehicle forward and thus take the other wheel out of the soft spot.

In order to change the ratio of the speed of rotation of the two driving wheels, means are provided for causing the worm 33 to rotate about its own axis, such means, in the embodiment of my invention here illustrated, comprising friction drums 48 which are secured to, and preferably formed integral with the gears 45 and which are engaged by friction bands 49 (see Fig. 9), either of which bands may be actuated to stop the rotation of either friction drum by means of a common hand-wheel 50, which is similar to the steering wheel of an automobile. The hand-wheel 50 is secured on a shaft 51 which has its bearing at 51', shaft 51 being connected to a shaft 52 having its bearings in the intermediate section 8 of the frame and in the front section, respectively, the shaft being provided with a universal joint 52' in line with the vertical axis formed by the bolts or bars 9. To the front end of the shaft 52 is secured a two-armed member 53 (see Fig. 3) which actuates levers 54 pivoted at 54', the outer ends of the levers 54 being connected to the ends of arms 55 (see Fig. 1) through links 56. The levers 55 are secured on shafts 57 to the other ends of which are connected the ends of the friction bands 49, so that when the shaft 57 is rotated one of the bands 49, depending on the direction of rotation of the hand-wheel 50 and the shaft 52 will be applied to the corresponding friction drum and prevent rotation thereof.

To the rear end of the driving shaft 22 is secured a worm 58 which engages a worm wheel 59 (see Fig. 10), which actuates, through an ordinary differential, the two rear wheels, the connections between the differential and one of the driving wheels only being shown in Fig. 10. The differential mechanism is indicated in general by the reference character 60, and as this is of a well known type, the details of the same will not be described. One side of the differential is connected to a shaft 61, at the end of which is secured a pinion 62, which, in turn, engages an internal gear 63 secured to the rear driving wheel 13. When a differential of the character illustrated is used in connection with the rear wheels, it will be understood that, while the two gear wheels are normally driven forwardly at the same speed when the vehicle is proceeding in a straight line, either wheel is free to rotate more rapidly than the other, as when the vehicle is passing around a curve.

In accordance with my invention the prime mover and parts auxiliary thereto are carried by the front section which also carries the means for steering the vehicle, the steering means being entirely independent of the remainder of the vehicle. It will thus be apparent that the intermediate and rear sections of the tractor may readily be disconnected and in place thereof a wagon, or any farm implement, such as a plow, may be connected to the front section and the steering controlled by any suitable mechanism.

The operation of the device embodying my invention will readily be understood from the foregoing description, and is as follows:

Normally the prime mover, which is connected, through the worm 26 and worm gear 27, to the front differential, drives both of the front wheels 3 forwardly at the same speed, since they are normally locked together through the self-locking differential gears in the described manner. Now, in order to change the direction of movement of the vehicle, the hand-wheel 50 is rotated in the direction which it is desired to change the direction of movement of the vehicle, in precisely the same manner as the steering wheel of an ordinary automobile. Through the described connections, one or the other of the brake bands 49 is applied to the friction brake drums 48, thereby interrupting the rotation of the corresponding friction drum and causing the pinions 44 to rotate about their own axes and thereby rotate the worms 33. The rotation of the worms 33 correspondingly rotates the worm wheels 36 and the differential pinions 40, thereby causing the gears 41 to rotate at different speeds and thereby causing the vehicle to change its direction of movement, the rear wheels, when the same are used as illustreated in the drawings, being free to change their relative speeds in the same manner as the rear wheels of an ordinary automobile connected to the prime mover through an ordinary differential.

It is to be understood that while I have illustrated my invention in connection with a vehicle comprising a rear truck having two driving wheels mounted thereon, my invention is not limited to this arrangement, as a single wheel may be used, or the rear truck may be dispensed with entirely and in place thereof an implement such as a plow or a harrow may be connected to the rear portion of the vehicle in place of the rear truck.

While I have herein shown and described one modification of my invention, I do not desire to be limited to the exact arrangement shown and described. but seek to cover in the appended claims all those modifications which come within the true spirit and scope of my invention.

What I claim and desire to secure by Letters Patent of the United States is:—

1. A vehicle comprising front and rear trucks and overlapping truss members connecting the two arranged in different planes, the first truss member forming a pivotal connection with the rear truck, and the second truss member forming a pivotal connection with the first named truss member at a point in advance of the first named pivotal connection.

2. A vehicle comprising front and rear trucks and overlapping truss members connecting the two arranged in substantially vertical and horizontal planes respectively, the vertical truss member forming vertically spaced pivotal connections with the front truck and a pivotal connection with the rear truck, and the horizontal truss member forming a pivotal connection with the vertical truss at a point in advance of said pivotal connection formed with the rear truck.

3. A vehicle comprising front and rear trucks and overlapping truss members connecting the two arranged in substantially vertical and horizontal planes respectively, each truck being provided with drive wheels, a motor for driving the vehicle, the vertical truss member forming a pivotal connection with the rear truck, and the horizontal truss member forming a pivotal connection with the vertical truss member at a point in advance of said pivotal connection formed with the rear truck. and a drive shaft concentric with said pivotal connection formed between the vertical truss member and the rear truck and between the horizontal truss member and the vertical truss member.

4. A vehicle comprising front and rear trucks and overlapping truss members connecting the two and arranged in substantially vertical and horizontal planes respectively, each truck being provided with driving wheels, a motor for driving the vehicle, the vertical truss member forming vertically spaced pivotal connections with the front truck and a pivotal connection with the rear truck, and the horizontal truss member forming a pivotal connection with the vertical truss member at a point in advance of said pivotal connection formed with the rear truck, and a shaft driven by said motor concentric with the pivotal connection between the vertical truss member and the rear truck and with the pivotal connection between the horizontal truss member and the vertical truss member.

5. In a vehicle, a frame comprising front and rear trucks and overlapping truss members connecting the two arranged in different planes, the rear truck being provided with a housing for the transmission, the first truss member forming a pivotal connection with the housing of the rear truck, and the second truss member forming a pivotal connection with the first named truss member at a point in advance of the first named pivotal connection.

6. A vehicle comprising front and rear trucks and overlapping truss members connecting the two arranged in substantially vertical and horizontal planes respectively, each truck being provided with driving wheels, a motor for driving the vehicle, the rear truck being provided with a housing for the transmission, the vertical truss member forming vertically spaced pivotal connections with the front truck and a pivotal connection with said housing, and the horizontal truss member forming a pivotal connection with the vertical truss member at a point in advance of said pivotal connection formed with the rear truck, and a shaft driven by said motor concentric with the pivotal connections between the vertical truss member and the housing and with the pivotal connection between the two truss members.

7. A vehicle comprising front and rear sections and an intermediate section connected together and arranged to permit the front and rear sections to swing with reference to each other in a horizontal plane and to permit rotary movement of said sections with reference to each other about a longitudinal axis, the front section comprising a motor and parts auxiliary thereto for driving the vehicle, and also comprising steering mechanism independent of the rest of the vehicle, the control for the steering mechanism comprising connections extending through the intermediate section, said connections being provided with a universal joint located substantially in a vertical line with the pivotal connection between the front truck and the intermediate section.

8. A vehicle comprising a main driving truck fitted with driving wheels, an auxiliary truck fitted with driving wheels connected to the main truck and constructed and arranged to afford freedom of movement thereto, a prime mover, means for transmitting power from said prime mover to the driving wheels of both trucks, and a normally self-locking worm and worm wheel for increasing the speed of one wheel of the main truck and simultaneously decreasing that of the other.

9. A vehicle comprising a main driving truck fitted with driving wheels, an auxiliary truck fitted with driving wheels connected to the main truck and constructed and arranged to afford freedom of movement thereto, means for transmitting power from said prime mover to the wheels of both trucks, means for normally locking the drive wheels of the main driving truck together, and associated means for increasing the speed of one of the wheels of the main driving truck and simultaneously decreasing that of the other.

10. In a tractor, a frame comprising front and rear sections each provided with driving wheels, a motor, driving connections between said motor and the driving wheels of both sections, said connections comprising a differential and means associated with said differential for varying the speed ratio of the wheels of one section.

11. In a vehicle, a frame comprising front and rear sections and an intermediate section connected together and arranged to permit the front and rear sections to swing with reference to each other in a horizontal plane, and to permit rotary movement of said sections with reference to each other about a longitudinal axis, the front section comprising a motor and parts auxiliary thereto for driving the vehicle, and also comprising steering mechanism independent of the rest of the vehicle.

12. A vehicle comprising a frame formed with front and rear sections and an intermediate section, the front and rear sections being provided with driving wheels, one section being pivoted to the intermediate section to permit swinging movement in a horizontal plane between the two, and the other section having bearings in the intermediate section to permit rotary movement about a longitudinal axis, the front section comprising a motor and parts auxiliary thereto for driving the vehicle and also comprising steering mechanism independent of the rest of the vehicle and means for transmitting power from said prime mover to said driving wheels.

13. In a vehicle, a frame comprising front and rear trucks and a vertically arranged intermediate section connecting said trucks and comprising compression and tension members united to form a bearing, means for driving the vehicle comprising a differential on the rear truck, the casing of which is formed with a journal adapted to seat in said bearing, whereby tilting movement between said truck and said intermediate section is permitted.

In testimony whereof I have hereunto signed my name in the presence of two subscribing witnesses.

NORMAN C. STOREY

Witnesses:
ADELE S. EBERHARDT,
DANN L. WOOD.